United States Patent [19]

Peterson

[11] 4,195,121
[45] Mar. 25, 1980

[54] THIN FLEXIBLE ELECTRODES AND THE METHOD FOR PRODUCING THEM

[75] Inventor: Gordon E. Peterson, Cleveland, Ohio

[73] Assignee: Union Carbide Corporation, New York, N.Y.

[21] Appl. No.: 890,974

[22] Filed: Mar. 28, 1978

[51] Int. Cl.² .................. H01M 4/54; C04B 35/00
[52] U.S. Cl. .................... 429/127; 252/182.1; 264/104; 429/217
[58] Field of Search ............ 429/206, 217, 212, 213, 429/214, 245, 127; 252/182.1; 264/104; 526/317

[56] References Cited

U.S. PATENT DOCUMENTS

| | | | |
|---|---|---|---|
| 2,902,530 | 9/1959 | Eisen | 429/217 |
| 3,023,259 | 2/1962 | Coler et al. | 429/127 |
| 3,120,457 | 2/1964 | Duddy | 156/6 |
| 3,184,339 | 5/1965 | Ellis | 264/104 |
| 3,314,820 | 4/1967 | Smith | 429/217 |
| 3,531,325 | 9/1970 | Lux et al. | 264/272 |
| 3,830,661 | 8/1974 | Tsuchida et al. | 252/182.1 |
| 3,891,603 | 6/1975 | Heil et al. | 526/317 |
| 3,918,989 | 11/1975 | Gillman et al. | 429/206 |
| 4,056,664 | 11/1977 | Jaffe | 429/217 |
| 4,092,464 | 5/1978 | Dey et al. | 429/127 |

FOREIGN PATENT DOCUMENTS

| | | |
|---|---|---|
| 48-16086 | 5/1973 | Japan . |
| 48-19446 | 6/1973 | Japan . |
| 963380 | 7/1964 | United Kingdom ...... 526/317 |
| 1176696 | 1/1970 | United Kingdom ...... 526/317 |

Primary Examiner—Donald L. Walton
Attorney, Agent, or Firm—Cornelius F. O'Brien

[57] ABSTRACT

A method for producing thin, flexible electrodes for flexible cells and the electrodes so produced comprising an active material and a minor amount of an ethylene acrylic acid polymer.

5 Claims, No Drawings

THIN FLEXIBLE ELECTRODES AND THE METHOD FOR PRODUCING THEM

FIELD OF THE INVENTION

The invention relates to thin, flexible electrodes, the method for producing them and the cells employing them comprising an active material and a minor amount of an ethylene acrylic acid polymer (EAA).

BACKGROUND OF THE INVENTION

The battery has become a primary power source for many portable electronic devices, such as radios, hearing aids, watches, calculators and the like. In order to maintain the overall electronic device as compact as possible, the electronic devices are usually designed with cavities to accommodate miniature batteries as their source of power. The cavities are usually made so that a battery can be snugly positioned therein, thus making electronic contact with appropriate terminals within the device. A major potential problem in the use of battery powered devices of this nature is that if the battery bulges, it usually becomes wedged within the cavity of the device which sometimes can result in damage to the device. Another problem with the manufacture of miniature electronic devices is that it is not always possible to provide adequate spacing or cavities to accommodate standard-type miniature cells, such as button cells. A specific example of this is in the digital readout watches and the wafer-thin calculators. Thus in order to provide a sufficient power source for these devices, the battery industry has resorted to not only miniaturization of the battery but to also exploring different types of active battery components which will provide long service. For example, recently developed electrochemical cell systems that will provide a long service life utilize highly reactive anode materials, such as lithium, sodium and the like in conjunction with high energy density liquid cathode materials and nonaqueous electrolytes. However, in the employment of these types of cell components, the conventional cylindrical cell or button cell type construction has been resorted to.

The battery industry has also resorted to flat-type cell constructions for use in portable electronic devices having cavities to accommodate the flat cell construction. However, the flat-type battery constructions usually employ cathode and anode components that are relatively rigid in nature and thus cannot be bent to any appreciable degree without affecting the electrochemical reactions of the cell. Thus the portable electronic device industry has been required to provide definitive size cavities within the device to accommodate relatively rigid cylindrical or flat-type constructed batteries.

It is, therefore, a primary object of this invention to provide a thin, flexible electrode strip which can be employed to produce a flexible battery which can be bent to accommodate a curvilinear cavity within the device so as to give the electronic device industry greater flexibility in the design of electronic devices.

Another object of the present invention is to provide a thin, flexible electrode strip that can be bent 180° around a radius of 1.25 inches (3.175 cm) or less without cracking or chipping at room temperature (i.e., about 20° C.).

Another object of the present invention is to provide a thin, flexible battery that can be bent into a curvilinear configuration without affecting its electrochemical performance.

Another object of the present invention is to provide a thin, flexible cathode strip comprising an active cathode material and a minor amount of an ethylene acrylic acid polymer.

Another object of the present invention is to provide a thin, flexible anode strip for use in electrochemical cells comprising an active material and a minor amount of an ethylene acrylic acid polymer.

The foregoing and additional objects will become more fully apparent from the following description.

SUMMARY OF THE INVENTION

The invention relates to a thin, flexible electrode strip for use in electrochemical cells comprising an active material and a minor amount of a solid ethylene acrylic acid polymer and wherein said flexible electrode strip can be bent 180° around a radius of 1.25 inches (3.175 cm), preferably around a radius of 0.5 inch (1.27 cm), without cracking or chipping at room temperature (i.e., about 20° C.). A thin, flexible cathode strip would comprise a reducible metal oxide or sulfide along with a minor amount of an ethylene acrylic acid polymer of between about 2 and 15 weight percent based on the weight of the dry constituents of the cathode electrode. A thin, flexible anode strip would comprise an oxidizable metal material in conjunction with a minor amount of an ethylene acrylic acid polymer of between about 0.5 and about 5 weight percent based on the weight of the dry constituents of the anode electrode. The ethylene acrylic acid material for use in this invention is a solid copolymer of ethylene acrylic acid.

The invention also relates to a method for producing a thin, flexible electrode strip comprising the steps:

(a) blending together an active material powder with a minor amount of an ethylene acrylic acid polymer powder to form an electrode mix; and (b) compressing the electrode mix with a pressure between about 500 and about 10,000 psi and heating it to a temperature of between about 60° C. and about 93° C. to form a thin, flexible electrode strip having a 30-65 percent packing, preferably between about 40 and 50 percent packing.

The thin, flexible electrode strip can then be punched or cut to make various shaped flexible electrodes which can be used to produce various shaped cells. In the heating step of the operation, it is necessary to soften the ethylene acrylic acid polymer particles to make them tacky and thereby bind the cathode or anode mix materials together. However, during the heating step, it is necessary that the heat be maintained below the point whereby the ethylene acrylic acid polymer powders will flow and coat the mix particles, thereby rendering them chemically inactive. To minimize the tendency of the ethylene acrylic acid polymer to coat the mix particles, it is desirable to work the mixture as little as possible during the heating and pressing operation.

Another factor to consider in preparing the electrodes of this invention is to insure that the pressure used to compact the electrode mix is adequate to produce a thin, flat electrode but not severe enough to produce a dense overly compacted electrode mix which, after the heat treatment, would have a tendency to crack or chip when bent. Pressures between about 500 and about 10,000 psi would be suitable in preparing cathode mixes while preferably pressures between about 1000 and 2000 psi could be used. Pressures between about 1000 and 10,000 psi would be suitable in preparing anode mixes while preferably pressures between about 2000 and 4000 psi could be used. In general, the nature of the electrode mix will usually dictate the pressure to be employed in making the flexible electrode in accordance with this invention.

The ethylene acrylic acid polymer additive functions as a binder in the active material mix thereby imparting strength and flexibility to the electrode which enables the electrode to be bent 180° around a radius of 1.25 inches (3.175 cm) or less without cracking or chipping. Thus thin, flexible cathodes can be produced having a thickness between about 0.005 inch (0.013 cm) and about 0.050 inch (0.127 cm), preferably between about 0.010 inch (0.025 cm) and about 0.020 inch (0.051 cm). Generally, thin, flexible anodes can be produced having a thickness of about one-third of the thickness values for the cathodes. For example, the anode thickness can vary between about 0.002 inch (0.005 cm) and about 0.025 inch (0.064 cm). The amount of ethylene acrylic acid polymer powder to be added to the active material will depend primarily on the nature of the active materials being employed to produce the flexible electrode. Generally, in producing cathodes made from such materials as manganese dioxide, silver oxide (monovalent and/or divalent), mercury oxide, copper oxide, iron sulfide, nickel oxide and nickel hydroxide, the ethylene acrylic acid polymer should be added in an amount between about 2 and 15, and preferably between about 2.5 and 5, weight percent based on the weight of the dry constituents of the electrode. Generally, in producing anodes made from zinc, lead, aluminum, magnesium and cadmium, the ethylene acrylic acid polymer powder should be added in an amount between about 0.5 and 5, preferably between about 1 and 2, weight percent based on the weight of the dry constituents of the electrode.

It has been found that with the addition of an ethylene acrylic acid polymer in the amounts shown above, the electrode mix so produced can be fabricated into thin strips of various curved configurations and can be bent 180° around a radius of 1.25 inches (3.175 cm) or less without cracking, chipping or otherwise effecting the electrochemical performance of the electrode when employed in its intended use in a battery. An amount less than the minimum amount specified above of the ethylene acrylic acid polymer for use in the electrodes of this invention would not provide adequate cohesion of the active materials of the electrode to form a thin, flexible strip. An amount of ethylene acrylic acid polymer greater than that specified above for use in this invention would provide a relatively rigid electrode that may not possess the necessary flexibility to withstand bending without cracking or chipping and, in addition, would be detrimental to cell capacity since too much of the active material would be physically replaced by the ethylene acrylic acid polymer which is not an active material. Thus the ethylene acrylic acid polymer should preferably be added in the amount as specified above so as to insure that thin, flexible electrodes can be produced which can bent to a degree as specified above.

It is also within the scope of this invention to additionally add a minor amount of a stabilizer or other suitable additive to the active material mix to further alter the physical characteristics of the mix to facilitate the fabrication of the electrode into various curved electrode configurations. Examples of some additives are ethylene bis-stearamide, lead stearate, zinc stearate and calcium stearate.

The cathode and anode electrodes produced in accordance with this invention can be suitably assembled with a conventional separator therebetween for use with various electrolyte systems to produce an overall thin, flexible cell. Suitable anode-cathode-electrolyte systems would be as follows:

| Anode | Cathode | Electrolyte |
| --- | --- | --- |
| Zinc | $MnO_2$ | Aqueous KOH or NaOH |
| Zinc | HgO | Aqueous KOH or NaOH |
| Zinc | Ag oxide | Aqueous KOH or NaOH |
| Zinc | CuO | Aqueous KOH or NaOH |
| Lithium | CuO | Nonaqueous organic solution |
| Lithium | Iron sulfide | Nonaqueous organic solution |
| Cadmium | Nickel oxide | Aqueous KOH or NaOH |
| Cadmium | Nickel hydroxide | Aqueous KOH or NaOH |

The separator could be of the conventional type such as starch- or methylcellulose-coated paper, cast cellulose film, gelled wheat starch or flour paste, felted or woven fibers of plastic such as nylon, polyethylene, etc. or porous cast vinyl sheets.

To eliminate the possible shorting of the electrodes around the edges of the separator, the cathode electrode may be encased at least on its outer side and edge area with a flexible material such as ethyl cellulose, vinyl, polyvinyl acetate or polyvinyl chloride. In like manner, if desired, the anode electrode may be encased at least on its outer surface and edge area with a similar material. In addition, the anode, separator and cathode assembly may be fully encased or enclosed within a flexible material such as vinyl tubing or the like. An alternate approach to eliminate internal shorts at the edges of the flexible electrode is to reduce the width and/or length of the cathode electrode relative to the anode electrode and/or dip coat one or both electrodes with a particular coating such as ethyl cellulose, vinyl, polyvinyl acetate or polyvinyl chloride.

The thickness of the overall cell produced in accordance with this invention can vary between about 0.025 inch (0.635 cm) and about 0.15 inch (0.381 cm), preferably between about 0.040 inch (0.1016 cm) and about 0.060 inch (0.1524 cm).

Suitable contacts for the electrodes can be a conductive wire, tab or other conductive extension electronically connected to the electrode and projecting out of the cell assembly. A cell so produced in accordance with this invention can be suitably flexed or bent 180° around a radius of 1.25 inches (3.175 cm) or less without cracking or chipping thus enabling it to be bent into a sinuous or curvilinear form to accommodate a like-shaped cavity in an electronic device in which it is to be used. The cell of this invention would also be admirably suited for use with an electronic watch wherein the flexible cell may be incorporated within the band of the watch so that the watch casing may be utilized completely for the electronic components and watch movements. In a like manner, cells made in accordance with this invention can be appropriately incorporated into straps, belts, tubes or the like to power various types of portable electronic devices.

EXAMPLE 1

Four cathodes were prepared using a mix consisting of 80% Ag$_2$O, 16% MnO$_2$ and 4% graphite to which was added 5% by weight of an ethylene acrylic acid polymer. The mix was spread on a silver-painted 0.0015 inch thick steel sheet to a height of 0.030 inch and covered an area of 0.5 inch by 2.0 inches. The mix and steel substrate were preheated at 200° F. for 5 seconds. Thereafter the mix and steel substrate were pressed between two plates at 93° C. under a pressure as shown in Table I. Upon release of the plates, each electrode was removed and its thickness measured. Each electrode strip was then longitudinally bent around a 0.75 inch diameter mandrel to test its flexibility. The thickness measurements and results of the bending test are shown in Table I.

TABLE I

| Test Sample | Pressure (psi) | Thickness (inch) | ¾ Inch Diam. Bending Test | |
|---|---|---|---|---|
| | | | Compression Side | Tension Side |
| 1 | 1000 | .012 | no cracks | no cracks |
| 2 | 2000 | 0.010 | no cracks | no cracks |
| 3 | 5000 | 0.115 | no cracks | cracked |
| 4 | 10,000 | 0.010 | no cracks | cracked |

The results of this test show that if the pressure is too great during the fabrication of the electrodes, overly dense electrodes will be produced which will tend to crack on the tension side when bent.

EXAMPLE 2

Three cathodes were prepared using the same mix as in Example 1 and then under a pressure of 2,000 pounds per square inch, each electrode mix was heated to a different temperature level for 5 seconds. The resulting thickness was measured and the physical condition of each electrode strip was observed when it was longitudinally bent around a 0.75 inch diameter mandrel. The data so obtained are shown in Table II.

TABLE II

| Test Sample | Temperature (°C.) | Thickness (inch) | ¾ Inch Diam. Bending Test | |
|---|---|---|---|---|
| | | | Compression Side | Tension Side |
| 1 | 66° C. | 0.013 | no cracks | no cracks |
| 2 | 93° C. | 0.012 | no cracks | cracks |
| 3 | 121° C. | 0.0115 | no cracks | cracks |

The results of this test show that if the cathode mix is heated too high, a more rigid electrode will be produced which will tend to crack.

EXAMPLE 3

Four cathodes were prepared using the mix of Example 1 except that the amount of ethylene acrylic acid polymer added ranged from 0 to 10% by weight of the mix. Each electrode mix was compressed under a force of 2000 pounds per square inch at an elevated temperature of 80° C. for 5 seconds. Again, the resulting thickness was measured and the physical condition of each electrode strip was observed when it was longitudinally bent around a 0.75 inch diameter mandrel. The data so obtained are shown in Table III.

TABLE III

| Test Sample | EAA Weight Percent | Thickness (inch) | ¾ Inch Diam. Bending Test | |
|---|---|---|---|---|
| | | | Compression Side | Tension Side |
| 1 | 0 | 0.011 | cracked | no cracks |
| 2 | 2½ | 0.011 | no cracks | no cracks |
| 3 | 5 | 0.012 | no cracks | no cracks |
| 4 | 10 | 0.011 | no cracks | no cracks |

The results of this test show that by the addition of ethylene acrylic acid polymer to the cathode mix in the weight percentages shown, a flexible electrode can be fabricated that will not crack when longitudinally bent around a 0.75 inch diameter mandrel.

EXAMPLE 4

Four cathodes were prepared using the mix of Example 1 except that the amount of ethylene acrylic acid polymer added ranged from 2.5% to 10% by weight of the mix. Each electrode mix was then compressed as shown in Table IV for 5 seconds at an elevated temperature of 80° C. Again, the resulting thickness was measured and the physical condition of each electrode strip was observed when it was longitudinally bent around a 0.75 inch diameter mandrel. The data so obtained are shown in Table IV.

TABLE IV

| Test Sample | EAA Weight Percent | Pressure (psi) | ¾ Inch Diam. Bending Test |
|---|---|---|---|
| | | | Compression Side |
| 1 | 5 | 5000 | no cracks |
| 2 | 2½ | 2500 | cracks |
| 3 | 10 | 1000 | no cracks |
| 4 | 5 | 2500 | no cracks |

The results of this test show that by using the proper amount of ethylene acrylic acid polymer powder additive and pressure, flexible electrodes can be produced in accordance with this invention.

EXAMPLE 5

Three lots, each lot consisting of three cells, were prepared using the following components:

Each cathode was prepared from a mix consisting of 80% Ag$_2$O, 16% MnO$_2$ and 4% graphite to which was added 10% by weight of ethylene acrylic acid polymer and 1% by weight of stainless steel powder. The mix was spread onto a steel foil collector to a thickness of 0.06 inch and after a cellophane layer was disposed thereon, it was then pressed at 2000 pounds per square inch at a temperature of 82° C. for 10 seconds which produced a 0.022 inch thick electrode. The electrode stock was cut into 0.110 inch wide by 5 inch long strips. The three cathodes forming Lot 1 were dip-coated in a 7.4% by weight solution of ethyl cellulose in ethylene dichloride and drip-dried at room temperature. The three cathodes forming Lot 2 were dip-coated in an 11% by weight solution of cellulose acetate butyrate in acetone and drip-dried at room temperature. The three cathodes forming Lot 3 were dip-coated in a 24% by weight rubberized styrene in methylisobutyl ketone (MIK) and drip-dried at room temperature.

Each anode was prepared using 325 Tyler mesh zinc powder containing 1.2% ethylene acrylic acid polymer and 5.8% HgO. The mix was pressed onto both sides of a copper foil collector whereupon a nonwoven rayon separator was disposed on both sides. Each assembled anode was pressed at 3000 pounds per square inch at 82° C. for 10 seconds and then cut into 0.125 inch wide by 2.5 inch wide long strips.

The electrolyte for each cell consisted of 0.15 cc of 45% KOH.

Each cathode strip was transversely folded about an anode producing a 2.5 inch long cell which was encased in a 0.003 inch (0.00762 cm) thick polyvinyl chloride shrink tubing. The electrolyte was then added to the separator and cathode assembly whereupon after ten minutes the tubing was heat shrunk around the assembly. The open circuit voltage (O.C.V.), impedance and continuous drain across a 3K ohm load were measured. The data so obtained are shown in Table V.

TABLE V

| Test Sample | O.C.V. (Volts) | Impedance 40 HZ | 1000 HZ | Drain Across 3K ohm Load |
|---|---|---|---|---|
| Lot 1-1 | 1.571 | 11.0 | 8.2 | 115 hours |
| Lot 1-2 | 1.557 | 14.0 | 9.2 | 82 hours |
| Lot 1-3 | 1.531 | 23.0 | 4.0 | 5 minutes |
| Lot 1-1 | 1.525 | 8.2 | 4.0 | 15 hours |
| Lot 1-2 | 1.565 | 11.0 | 7.2 | 58 hours |
| Lot 1-3 | 1.559 | 7.3 | 2.6 | 44 hours |
| Lot 1-1 | 1.566 | 32.0 | 20.0 | 44 hours |
| Lot 1-2 | 1.544 | 9.3 | 4.9 | 2 hours |
| Lot 1-3 | 1.578 | 36.0 | 20.0 | 58 hours |

This test demonstrates that flexible strip cells can be produced using the teachings of this invention.

EXAMPLE 6

Six cathodes in twelve lots were produced using the mix described in Example 5 except that the stainless steel powder was deleted, a cellophane sheet was disposed on top of the cathode mix and the six electrodes in each lot were either coated with a barrier layer or given an extra cellophane layer as shown in Table VI.

TABLE VI

| Test Sample* | |
|---|---|
| 1 | Heated cathode dipped in hot 16% ethylene vinyl acetate (EVA) in toluene |
| 2 | Extra layer of cellophane |
| 3 | Heated cathode dipped in hot 16% polyvinyl acetate in toluene |
| 4 | Sprayed with vinyl aerosol |
| 5 | Cold cathode dipped in hot 16% EVA in toluene |
| 6 | 22% vinyl in MIK |
| 7 | Extra layer of cellophane |
| 8 | 9.2% ethyl cellulose in ethylene dichloride |
| 9 | 9.1% cellulose acetate butyrate in acetone |
| 10 | 22% vinyl in MIK |
| 11 | 11% rubberized styrene in MIK |
| 12 | 10.2% polyvinyl chloride (PVC) in tetrahydrofuran |

*All solutions are % by weight

A like number of anodes were produced as described in Example 5. The cathodes and anodes were then punched to a 0.438 inch (1.113 cms) diameter size and a 0.312 inch (0.792 cm) diameter size, respectively. Using a 45% KOH electrolyte and a commercial four-layer laminate separator, button cells were produced. The average open circuit voltage (O.C.V.), average impedance and average height of six cells in each lot were measured. The data so obtained are shown in Tables VII and VIII.

TABLE VII

| Test Sample | O.C.V. (volts) | Initial Impedance 40 HZ | 1000 HZ | Cell Height (in.) |
|---|---|---|---|---|
| 1 | 1.614 | 480 | 401 | .103 |
| 2 | 1.597 | 33.2 | 8.4 | .101 |
| 3 | 1.594 | 36 | 12.5 | .104 |
| 4 | 1.594 | 46 | 22 | .105 |
| 5 | 1.600 | 336 | 314 | .104 |
| 6 | 1.597 | 278 | 264 | .105 |
| 7 | 1.602 | 33.2 | 11.6 | .105 |
| 8 | 1.624 | 402 | 242 | .102 |
| 9 | 1.606 | 29.8 | 11 | .103 |
| 10 | 1.607 | 117 | 91 | .101 |
| 11 | 1.607 | 212 | 156 | .103 |
| 12 | 1.619 | 366 | 229 | .101 |

TABLE VIII

| Test Sample | O.C.V. (volts) | 10 Weeks At 54° C. Impedance 40 HZ | 1000 HZ | Cell Height (in.) |
|---|---|---|---|---|
| 1 | 1.585 | 121 | 117 | .102 |
| 2 | .898 | 2.9 | 2.3 | .099 |
| 3 | 1.239 | 4.5 | 2.9 | .103 |
| 4 | 1.365 | 16.8 | 12.9 | .105 |
| 5 | 1.561 | 121 | 96.2 | .103 |
| 6 | 1.585 | 149 | 111 | .104 |
| 7 | 1.580 | 13.4 | 7 | .104 |
| 8 | 1.538 | 295 | 107 | .102 |
| 9 | 1.587 | 14.9 | 6.2 | .101 |
| 10 | 1.585 | 102 | 65 | .100 |
| 11 | 1.585 | 89 | 70 | .102 |
| 12 | 1.587 | 357 | 136 | .100 |

This test demonstrates that thin button cells can be produced using the teachings of this invention.

It is to be understood that other modifications and changes to the preferred embodiments of the invention herein shown and described can also be made without departing from the spirit and scope of the invention.

What is claimed is:

1. A method for producing a thin, flexible electrode comprising the steps:
    (a) blending together an active material powder with a minor amount of an ethylene acrylic acid polymer powder to form a dry electrode mix; and
    (b) compressing the dry electrode mix with a pressure between about 500 and about 10,000 pounds per square inch and heating it to a temperature of between about 60° C. and about 93° C. to form a thin, flexible electrode stock.

2. The method of claim 1 wherein the electrode mix is a cathode mix and in step (a) the active material powder is selected from the group consisting of manganese dioxide, silver oxide (monovalent and/or divalent), mercury oxide, copper oxide, iron sulfide, nickel oxide, nickel hydroxide and mixtures thereof.

3. The method of claim 1 wherein the electrode mix is an anode mix and in step (a) the active material powder is selected from the group consisting of zinc, lead, aluminum, magnesium, cadmium and mixtures thereof.

4. The method of claim 1 wherein the ethylene acrylic acid polymer powder in step (a) is in an amount of between about 0.5 and about 15 weight percent based on the weight of the dry constituents of the electrode mix.

5. A thin, flexible electrode made in accordance with the method of claim 1.

* * * * *